(12) United States Patent
Escobar-Bowser et al.

(10) Patent No.: US 8,134,807 B2
(45) Date of Patent: Mar. 13, 2012

(54) THERMALLY ENHANCED DISK DRIVE

(75) Inventors: Priscilla Escobar-Bowser, Plano, TX (US); Axel Alegre De La Soujeole, Fairview, TX (US); Indumini Wijayanayake Ranmuthu, Plano, TX (US); Ramlah Razak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1205 days.

(21) Appl. No.: 11/844,924

(22) Filed: Aug. 24, 2007

(65) Prior Publication Data

US 2008/0301725 A1 Dec. 4, 2008

Related U.S. Application Data

(60) Provisional application No. 60/941,471, filed on Jun. 1, 2007.

(51) Int. Cl.
 *G11B 5/55* (2006.01)
(52) U.S. Cl. .................... 360/264.2; 360/244.1
(58) Field of Classification Search ............... 360/244.1, 360/264.2, 244.2, 244.3, 265.7, 265.9
See application file for complete search history.

(56) References Cited

U.S. PATENT DOCUMENTS

| 5,956,203 A | 9/1999 | Schirle et al. |
| 6,278,583 B1 * | 8/2001 | Adley ................... 360/244.1 |
| 7,016,158 B2 * | 3/2006 | Yamaoka et al. .......... 360/266.3 |
| 7,064,928 B2 | 6/2006 | Fu et al. |
| 2006/0164762 A1 | 7/2006 | Choi et al. |
| 2007/0097552 A1 | 5/2007 | Lee et al. |
| 2007/0153426 A1 * | 7/2007 | Izumi et al. ............... 360/264.2 |
| 2008/0088978 A1 * | 4/2008 | Ho et al. .................. 360/264.2 |

* cited by examiner

*Primary Examiner* — Jefferson Evans
(74) *Attorney, Agent, or Firm* — Dawn V. Stephens; Frederick J. Telecky, Jr.

(57) ABSTRACT

A disk drive data storage system. The system comprises a data storage disk, a movable member positioned near the data storage disk, and a sensor assembly, supported and movable by the movable member, for writing data to and reading data from the data storage disk. The system also comprises an integrated circuit that is electrically coupled to the sensor assembly and that moves with the movable member when the movable member moves the sensor assembly. The integrated circuit comprises a face and a backside, and the integrated circuit is in a fixed physical position relative to the movable member such that the backside is oriented toward the movable member.

18 Claims, 7 Drawing Sheets

THERMALLY ENHANCED DISK DRIVE

CROSS-REFERENCES TO RELATED APPLICATION

This application claims priority to, the benefit of the filing date of, and hereby incorporates herein by reference, U.S. Provisional Patent Application 60/941,471, entitled "Thermally Enhanced Disk Drive," and filed Jun. 1, 2007.

STATEMENT REGARDING FEDERALLY SPONSORED RESEARCH OR DEVELOPMENT

Not Applicable.

BACKGROUND OF THE INVENTION

The preferred embodiments are in the field of magnetic storage media drives and are more specifically directed to improving thermal conductivity of heat so as to facilitate smaller drives and faster read/write speeds in such drives.

Magnetic disk drives are used over a wide range of electronic systems, including large-scale network servers, desktop computers and workstations, portable computers, and now even in modern handheld devices such as portable digital audio players. As is well known in the art, the capacity of conventional disk drives has greatly increased over recent years, at ever decreasing cost per megabit, while at the same time the size of the drive continues to decrease. Indeed, the decrease in size permits the use of drives in smaller equipment, including the above-mentioned audio players and with likely additional applications in the future.

The decrease in disk drive size has been achieved in many ways, including the use of smaller parts and the dimensions between those parts. A relatively smaller drive includes a smaller disk or a stack of smaller disks arranged in a so-called head stack, where the axis of each disk is co-aligned and an arm is typically located between each disk as well as on top of the uppermost disk and below the lowermost disk. For example, in a head stack of two disks (i.e., an upper disk and a lower disk), then a first movable arm is supported so that its tip extends between the two disks and with a first read/write sensor assembly (or "head") located at its upper surface and a second read/write sensor assembly located at its lower surface; with this configuration, the first sensor assembly is for read/write operations with respect to the lower side of the upper disk, and the second sensor assembly is for read/write operations with respect to the upper side of the lower disk. A second movable arm is supported so that its tip extends above the top of the upper disk and with one read/write sensor assembly located at the lower surface of that tip for read/write operations with respect to the upper side of the upper disk. Finally, a third movable arm is supported so that its tip extends below the bottom of the lower disk and with one read/write sensor assembly located at the upper surface of its tip for read/write operations with respect to the lower side of the lower disk. In the prior art, each of the three (or other number) movable arms in the disk drive are moved by a common member, sometimes referred to as an armature block or also as an E-block because in the case of three arms as just described, the cross section of the member has an "E" shape in that each of the three physical supports, corresponding to the respective three arms, protrudes from a same perpendicular structure as do the horizontal lines in the letter "E."

Various factors such as the materials, dimensions, and proximity of the above and related components provide increasing complexities with the reduction in the size of device drives. For example, the movable arms are typically thicker metal near the area in which they connect to the E-block and then have a thinner metal suspension that extends in the direction of the disks and supports the respective sensor assembly or assemblies. Further, the size of the arms is commensurate with the size of the disks, and each sensor assembly is typically microscopic in dimensions. As another example, the entire E-block, and correspondingly the arms it supports, is rotated within an arc by a mechanism that typically includes a coil with magnets above and below the coil so that a reversible current through the coil can cause a partial rotation of the mechanism in either direction across the arc. As still another example, typically a preamplifer in the form of an integrated circuit is electrically connected to the sensor assemblies via a so-called flex unit, where in more contemporary devices the preamplifier is physically mounted in thermal communication with the side of the E-block. The preamplifier also may include fly-height circuitry that controls the distance between a read/write sensor assembly and its respective disk surface.

With all of the attributes described above, the present inventors have recognized that there are considerable thermal issues with respect to the head stack and its related components, sometimes referred to as the head stack assembly. For instance, there are various sources of heat in the confined space, including for example, power transistors in the preamplifier as well as from the coil driven mechanism that rotates the E-block. Further, with physical contact between certain components there is little, if any, air gap and, thus air is trapped and therefore is unable to efficiently release heat in such an area. In other words, there is simply little or no room for convection cooling. Various other factors also contribute to the accumulation of heat in and near the head stack assembly. With larger media, the movable arms must be longer and therefore require a greater amount of current to drive the inductance of the above-mentioned coils, thereby creating more heat. Further, the dimensions of the arms may reduce the ability to dissipate heat. As another example, the generation of heat increases with increasing data rates, such as 800 to 900 mbps in contemporary laptops. Still other examples may be appreciated by one skilled in the art.

Heat build-up in and near the head stack assembly is undesirable for many reasons. For example, long term heat exposure affects the lifespan of the unit, such as in connection with the deleterious effect that heat has on the silicon used to form the preamplifier. As another example, the accumulation of heat necessarily limits the speed at which the drive may be operated, as exceeding a determined limit will cause still more heat and affect lifespan and data integrity. In some applications, these factors may be less critical, whereas in others the demands of the marketplace are extremely high, so such factors are paramount and therefore so are the above-noted considerations. For these reasons, therefore, the present inventors seek to improve upon aspects related to the above, as is explored in connection with the preferred embodiments detailed below.

BRIEF SUMMARY OF THE INVENTION

In one preferred embodiment, there is a disk drive data storage system. The system comprises a data storage disk, a movable member positioned near the data storage disk, and a sensor assembly, supported and movable by the movable member, for writing data to and reading data from the data storage disk. The system also comprises an integrated circuit that is electrically coupled to the sensor assembly and that moves with the movable member when the movable member moves the sensor assembly. The integrated circuit comprises a face and a backside, and the integrated circuit is in a fixed physical position relative to the movable member such that the backside is oriented toward the movable member.

Other aspects are also disclosed and claimed.

BRIEF DESCRIPTION OF THE SEVERAL VIEWS OF THE DRAWING

FIG. 2b illustrates a partial view of a cross-section taken along lines 2b-2b in FIG. 2a.

DETAILED DESCRIPTION OF THE INVENTION

The inventive scope is described by way of example below in connection with a preferred embodiment as implemented into a magnetic disk drive used in connection with a computer system. However, other preferred embodiments, including systems, may receive significant benefit with disk drives constructed per the teachings of this document. Accordingly, it is to be understood that the following description is provided by way of example only and is not intended to limit the inventive scope.

Figure 1:
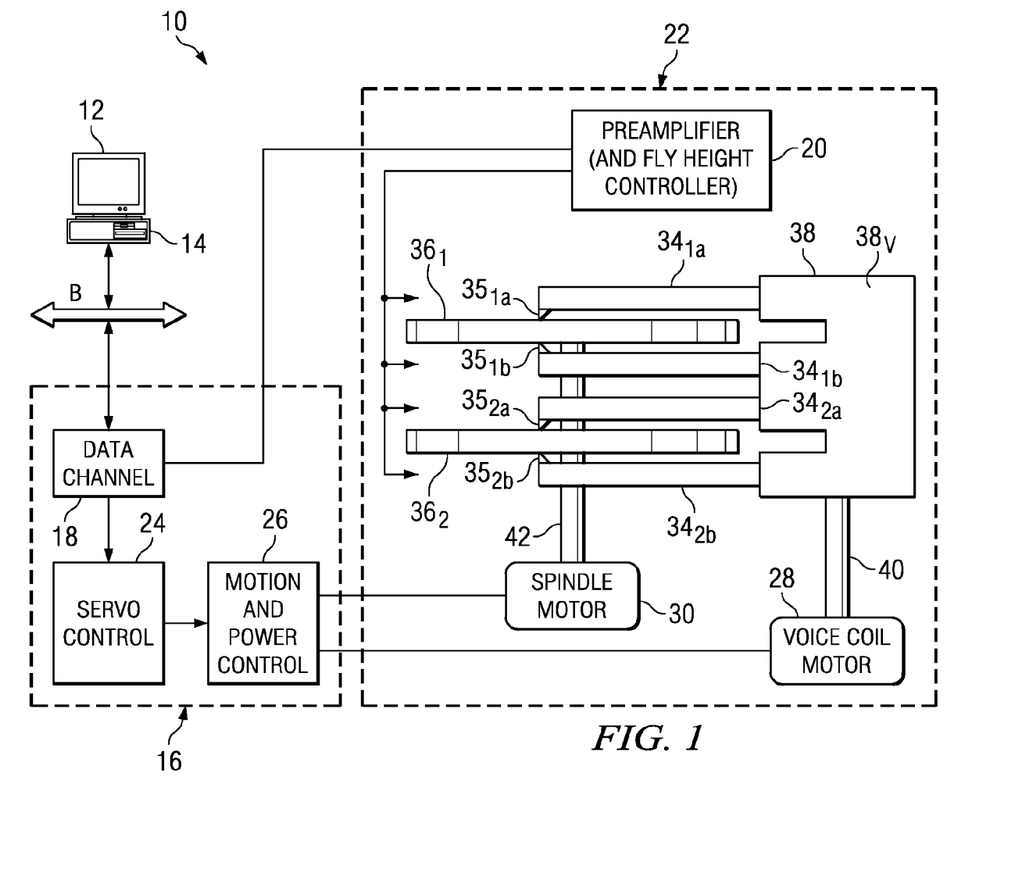
FIG. 1 illustrates an example of a computer system 10 into which a preferred embodiment may be implemented.

FIG. 1 illustrates an exemplary example of a computer system 10 into which the preferred embodiment is implemented. In this example, system 10 includes a computer 12, realized in the conventional manner. For example but not explicitly illustrated in FIG. 1, computer 12 includes a central processing unit ("CPU"), random access memory ("RAM"), video, sound cards or functionality, network interface capability, and the like. Computer 12 also includes a host adapter 14, which connects on one side to an internal system bus (not shown) of computer 12, and on the other side to a bus B. Bus B is preferably implemented according to conventional standards, examples of which include the Enhanced Integrated Drive Electronics ("EIDE") standard or the Small Computer System Interface ("SCSI") standard. Bus B is also connected to a disk drive controller 16. While not shown, other disk storage devices (hard disk controllers, floppy drive controllers, etc.) and other peripherals also may be connected to bus B, as desired and in a conventional manner.

Controller 16 is a conventional disk drive controller as known in the art. In modern disk drives in which the drive electronics are implemented at the disk drive rather than as a controller at computer 12 itself, controller 16 is implemented in a printed circuit board within the disk drive. Of course, in larger scale systems, controller 16 may be implemented within computer 12. In the generalized block diagram of FIG. 1, the components of controller 16 are shown according to their functions, rather than their physical integrated circuits, for the sake of clarity. Typical integrated circuits used to implement disk drive controllers such as controller 16 include a digital signal processor ("DSP"), read-only memory ("ROM") and RAM, other non-volatile storage such as flash RAM, interface circuitry connected to bus B, and other custom logic circuitry. Functionally, controller 16 includes a data channel 18, which is interfaced with bus B and performs the function of communicating data to and from a preamplifier (and possibly fly height controller) 20 of a hard disk assembly 22. Preamplifier 20 is shown in FIG. 1 in schematic block form with its physical integrated circuit layout detailed later. By way of further context here, preamplifier 20 provides appropriate differential voltage signals via traces to one or more read/write head sensor assemblies, where each such assembly 34 is supported at a position near either an upper or lower surface of a respective disk 36; in the example of FIG. 1, two such disks $36_1$ and $36_2$ are shown, with disk $36_1$ having respective sensor assemblies $35_{1a}$ and $35_{1b}$, and disk $36_2$ having respective assemblies $34_{2a}$ and $34_{2b}$. Each assembly $35_x$ extends from a respective arm of a common movable member referred to as a so-called E-block 38, which as discussed in the Background Of The Invention section of this document gets its name because its cross section has roughly an "E" shape in that, in the perspective shown in FIG. 1, there is a vertical section $38_V$ and then extending from that section is a horizontal upper arm supporting assembly $34_{1a}$, a horizontal middle arm supporting assemblies $34_{1b}$ and $34_{2a}$, and a horizontal lower assembly supporting assembly $34_{2b}$. In any event, the supporting assemblies $34_x$ support a respective sensor assembly $35_x$ for reading data from and writing to the disks $36_1$ and $36_2$, where these disks thereby serve as the storage medium of head-disk assembly 22. Data channel 18 also communicates with a servo control 24, which in turn communicates with a motion and power controller 26, which drives a voice coil motor 28 that rotates an axle 40 through an arc and that is connected to and thereby rotates E-block 38 to pivot or move about that same arc and thereby to move its associated supporting assemblies $34_x$ relative to the surface of disks $36_x$. Motion and power controller 26 also controls a spindle motor 30 that fully rotates an axle 42 that is connected to and thereby fully rotates disks $36_1$ and $36_2$. Lastly, note that various additional items may be associated with the apparatus and circuitry shown in FIG. 1, and such items are known to one skilled in the art but are eliminated from the illustration and discussion so as to focus the present discussion.

Looking in general to the operation of computer system 10 with respect to reading and writing data from and to hard disk assembly 22, disks $36_1$ and $36_2$ have ferromagnetic surfaces (on either one or both sides) that spin about their axis under the control of spindle motor 30. Further, read/write head supporting assemblies $34_x$ are movable by E-block 38 when E-block 38 is moved or pivoted by motor 28 and axle 38. Accordingly, signals from motion and power control function 26 in controller 16 control spindle motor 30 and voice coil motor 28 so that E-block 38 moves (e.g., partially rotates) and thereby positions the read/write head sensor assemblies $35_x$ at the desired locations of the surface of each disk $36_x$ to write or read the desired data. Data in this manner is communicated between preamplifier 20 and data channel 18, such as from bus B to a desired disk $36_1$ or $36_2$ of from such a desired disk back to bus B. Thus, such data is further accessible by other items connected directly to, or coupled via other circuitry, to bus B.

Figure 2A:
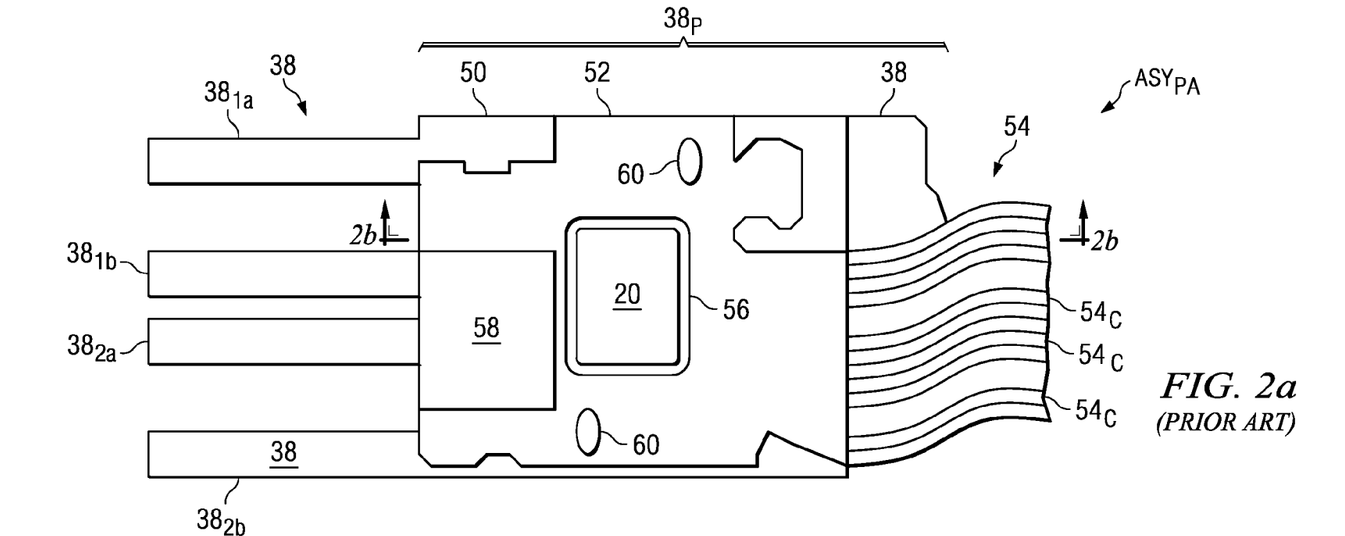
FIG. 2a illustrates a side view of an assembly that includes an E-block 38 and its related structure in one approach in the prior art.

FIG. 2a illustrates a side view of an assembly $ASY_{PA}$ that includes E-block 38 and its related structure from FIG. 1 in greater detail, and as implemented in one approach in the prior art. E-block 38 is typically formed of a metal such as aluminum or steel and provides a shape as mentioned above that approximates an E-shape from its side. Thus, in FIG. 2a, it may be appreciated that the metal of E-block 38 includes a generally square or rectangular portion $38_P$ with arms $38_{1a}$, $38_{1b}$, $38_{2a}$, and $38_{2b}$ extending from portion $38_P$. The subscripts of arms $38_x$ in FIG. 2a are chosen to match the corresponding supporting assemblies $34_x$ in FIG. 1 (not shown in FIG. 2b) that extend from each respective arm so as to support a read/write sensor assembly $35_x$ proximate a disk.

Figure 2B:
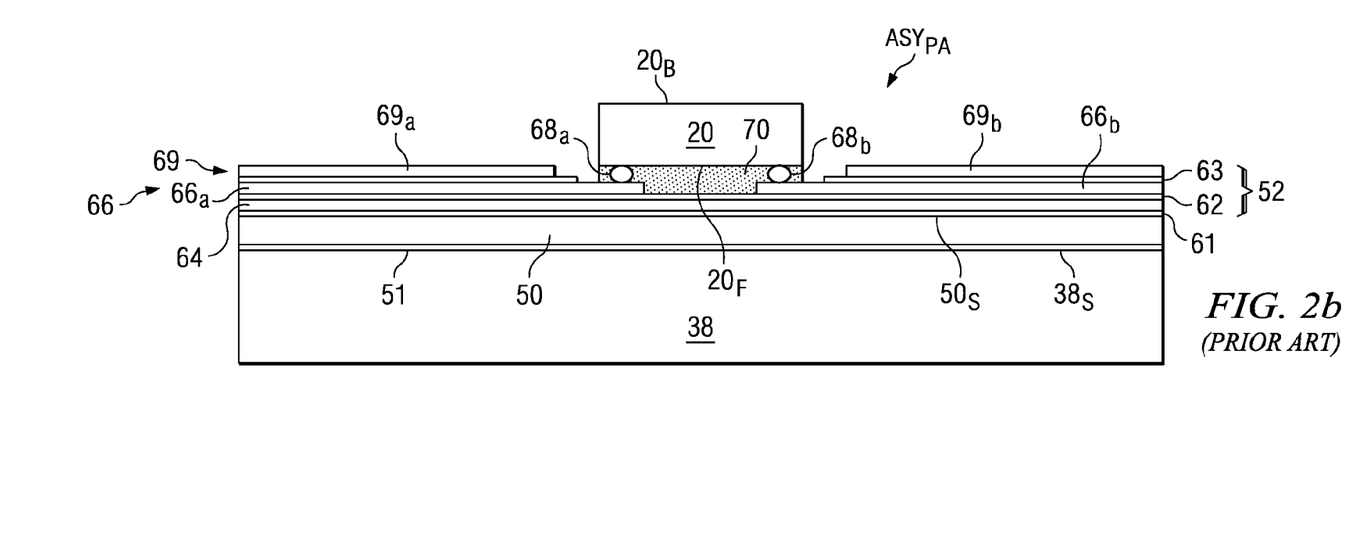

A stiffener 50 is adhered to a side of E-block 38, and for sake of distinction in FIG. 2a stiffener 50 is shown as a dotted square (or rectangle). Stiffener 50 is typically make of a metal such as aluminum. A so-called flex circuit (or assembly) 52 is adhered to stiffener 50 and, thus, also is positioned in the area relative to the side of E-block 38. As the term "flex" suggests in "flex circuit 52," the circuit is flexible, and as the term "circuit" suggests, it provides a function akin in many respects to a regular circuit board, that is, it provides various conductors and electrical connections as also further discussed below. Given the physical flexibility of flex circuit 52, it is further physically supported in a stiff manner by stiffener 50—this support is particularly beneficial during assembly, that is, it maintains the otherwise flexibility of flex circuit 52 in a stable form so as to support contact thereto and the like. Flex circuit 52 may take various shapes and, thus, in FIG. 2a it is shown to have various curves and notches in its outer perimeter. The electrical connections of flex circuit 52 extend to or include a flexible cable 54 that extends away from flex circuit 52 and is shown to include generally a number of conductor traces $54_C$, where only a few of such traces $54_C$ are labeled so as to not overly complicate the Figure; further with respect to additional electrical connections, flex circuit 52 includes an isolated region 56, such as centrally located in flex circuit 52 for example, and preamplifier 20 from FIG. 1 is positioned as an integrated circuit within isolated region 56. As shown in FIG. 2b and discussed later, electrical connection is made between preamplifier 20 and conductors in flex circuit 52, typically by way of solder bumps (or balls). Flex circuit 52 also includes a conductor region 58 that generally provides electrical connectivity between preamplifier 20 and the sensor assemblies $35_x$ (see FIG. 1). Also, for sake of example, additional solder balls 60 are shown that may also provide levels of electrical connection. Lastly, note that the flex circuit 52 may include various other connections and conductor traces and the like, but they are not shown so as to simplify the illustration and present discussion, while such attributes will be appreciated by one skilled in the art.

Given the perspective of the structure in FIG. 2a, note its relationship to the partial block diagram of FIG. 1. Specifically, the actual location of preamplifier 20 in FIG. 2a is shown in the form of an integrated circuit as opposed to the block form in FIG. 1. With respect to FIG. 2a, it may be seen that preamplifier 20 is fixed in a physical relationship relative to E-block 38, which as detailed below is accomplished via adhesive layers and stiffener 50. Further, recalling from FIG. 1 that preamplifier 20 is electrically connected to data channel 18, note in FIG. 2a that such connection is accomplished by numerous conductor traces in flexible cable 54. Thus, as motor 28 causes E-block 38 to pivot by angular rotation of axle 40, then preamplifier 20 also moves since it is affixed to the moving E-block 38, yet at the same time flexible cable 54 permits some physical movement of the conductors that carry electrical signals between preamplifier 20 and data channel 18. Additionally, recalling from FIG. 1 that preamplifier 20 is electrically connected to sensor assemblies $35_x$, note in FIG. 2a that such connection is accomplished by numerous conductor traces in flex assembly 52 and may be also through conductor region 58.

FIG. 2b illustrates a partial view of a cross-section taken along lines 2b-2b in FIG. 2a, where FIG. 2b is enlarged relative to FIG. 2a to better illustrate certain aspects although the Figure is not necessarily drawn to scale. For sake of reference, a portion of the mass of E-block 38 is seen and preamplifier 20 is shown to be fixed in a physical relationship relative to that portion via various intervening layers, and some of those layers as detailed below along with other layers form a cross-sectional view of flex circuit 52, as shown generally by a bracket and reference number 52 to the right of the Figure, and the various layers of flex circuit are described below. Prior to reaching that description, note that stiffener 50 is fixed, by an adhesive layer 51, to a surface $38_S$ of the metal of E-block 38.

Flex circuit 52 includes three adhesive layers 61, 62, and 63, shown with ascending reference numbers in a direction away from surface $50_S$ of stiffener 50, as well as some intervening layers between those adhesive layers as are now explained. An insulating layer 64 is located between adhesive layers 61 and 62; in typical applications, insulating layer 64 is made of a material commercially known as KAPTON as provided by DuPont and that is a polyimide that is often used in flexible printed circuits, and it is in the range of 18 to 25 microns thick. A copper layer 66, also in the range of 18 to 25 microns thick, is located between adhesive layers 62 and 63, and this layer is patterned or otherwise formed or partitioned in a way to provide many different conductor traces in different locations in layer 66. Indeed, to further appreciate that copper layer 66 may provide more than one conductor, in the cross-section of FIG. 2b copper layer 66 includes two different copper segments $66_a$ and $66_b$. Copper segment $66_a$ conducts through a solder bump $68_a$ to preamplifier 20, and copper segment $66_b$ conducts through a solder bump $68_b$ to preamplifier 20. In this regard and for sake of distinction later, note therefore that an electrical signal may be communicated from copper segment $66_a$, through solder bump $68_a$, to a circuit connection on the surface of preamplifier 20 that is facing downward in the perspective of FIG. 2b, and that surface is the face $20_F$ of preamplifier 20. In other words, and as known in the integrated circuit art, an integrated circuit die typically has a "topside," "face," or surface on or in connection with which the various circuitry of the device was formed when the device was built in connection with a semiconductor wafer, and electrical contact is therefore made to the circuitry on that face. Thus, in FIG. 2b, face $20_F$ of preamplifier 20 is in the direction of stiffener 50 and numerous electrical connections are made to face $20_F$. Of course in opposite fashion, therefore, the backside $20_B$ of preamplifier 20 extends in the opposite direction away from stiffener 50. Given these perspectives, note similarly that an electrical signal may be communicated from copper segment $66_b$, through solder bump $68_b$, to a circuit connection on face $20_F$ of preamplifier 20.

Completing the discussion of FIG. 2b, an insulating layer 69, also in the range of 18 to 25 microns thick and with preferably co-planar portions $69_a$ and $69_b$, is located on top of adhesive layer 63. Like insulating layer 64, in typical applications insulating layer 69 is also made of KAPTON. Finally, an underfill material 70 is located between the remainder of face $20_F$ of preamplifier 20 and adhesive layer 62. Typically, underfill material 70 is a resin located in the stated position and to accommodate the fact that the silicon used in the integrated circuit of preamplifier 20 has a low coefficient of thermal expansion and, therefore does not tend to shift in response to heat relative to the copper and KAPTON of layers 64, 66, and 69, which conversely have a higher coefficient of thermal expansion and, therefore may tend to shift more in response to heat. Accordingly, underfill material 70 allows for certain movement, particularly of portions of flex circuit 52, with the flexure of the underfill material 70 supporting an ongoing connection to solder bumps $68_a$ and $68_b$.

In connection with the inventive scope, it has been observed that the prior art structure of FIGS. 2a and 2b, while performing properly in various implementations, also may provide drawbacks, particularly as technology advances. Specifically, as device speeds and media size increase, and as device dimensions decrease, consideration of thermal issues are very important as was also introduced in the Background Of The Invention section of this document. Indeed, in tightly confined areas and/or those of small dimensions, there is little, if any, opportunity for convective heat transfer. Thus, to the extent heat may move in these areas, it is desirable to move it via conduction. However, in connection with FIG. 2b, note that each path of thermal conduction from preamplifier 20 toward E-block 38 includes numerous "thermal impedances," that is, regions providing resistance to the conduction of heat away from preamplifier 20. Particularly, while heat may be transferred from preamplifier 20 to E-block 38 and the ambient surrounding E-block 38, in a possible conduction path there are thermal impedances including that of: (1) solder bump 68; (2) copper layer 66; (3) adhesive layer 62; (4) insulating layer 64; (5) adhesive layer 61; (6) stiffener 50; and (7) adhesive layer 51. Further, in an alternative path from preamplifier 20 toward E-block 38 and that bypasses solder bump $68_a$ or $68_b$, the thermal impedance of the solder bumps as well as copper layer 66 is avoided, but instead heat must travel from face $20_F$ through underfill material 70. In addition, if misalignment occurs in any of the adhesive layers so that an air gap is formed between that layer and the adjacent layer to which it is supposed to adhere (e.g., as between adhesive layer 51 which is intended to adhere to E-block 38), then the air gap provides a relatively large impedance to the transfer of heat to the E-block and its surrounding ambient. Still other factors may provide thermal impedances in the prior art setup of FIGS. 2a and 2b, such as warping or a burr in stiffener 50, poor co-planarity between layers, and a presence of a void in any adhesive. Any or all of the above-described impedances therefore resist the transfer of heat and thereby permit a buildup of such heat in preamplifier 20, thereby potentially limiting its performance as well as its lifespan. Thus, the present inventors below provide various preferred embodiments that improve upon the prior art in view of these observations.

Figure 3:
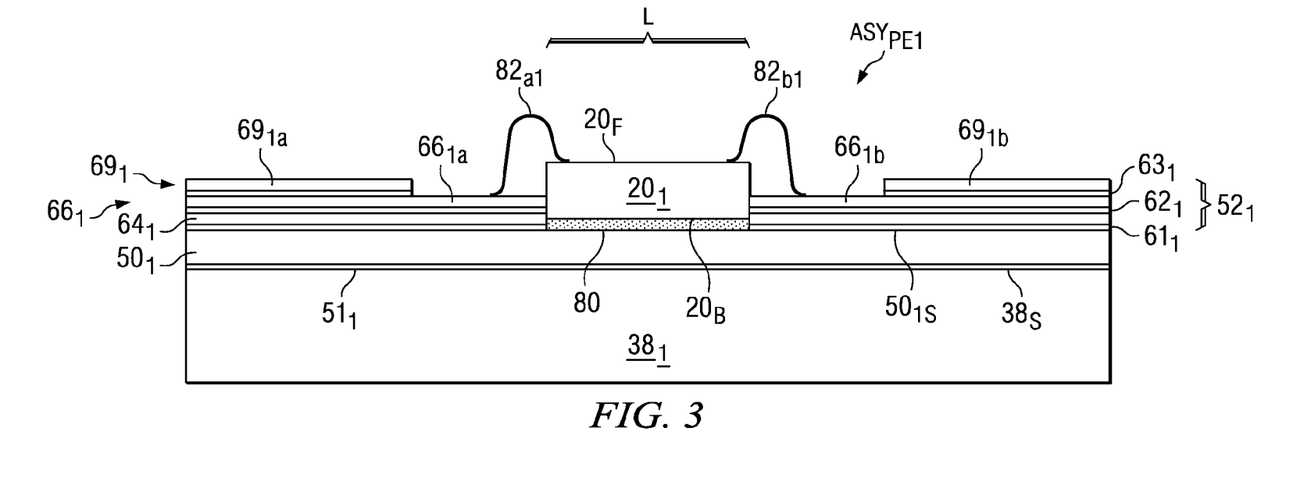
FIG. 3 illustrates a partial cross-sectional view of an assembly in one preferred embodiment with a preamplifier having its backside oriented toward its corresponding E-block and with electrical connections to the preamplifier via bond wires.

FIG. 3 illustrates a partial cross-sectional view of an assembly $ASY_{PE1}$ that may be implemented in one preferred embodiment and in connection with E-block 38, its related structure, and into system 10 from FIG. 1. Certain of the aspects in FIG. 3, as well as other embodiments described below, are comparable to prior art structures and for sake of simplicity such aspects use the same reference numbers as in the above-described FIGS. 2a and 2b, but different subscripts are added thereto so as to provide a basis to distinguish the preferred embodiments from the prior art, particularly where some change is made to such a structure. Thus, by ways of example, in FIG. 3, the E-block is referenced as E-block $38_1$, the stiffener is referenced as stiffener $50_1$, the preamplifier is referenced as preamplifier $20_1$, and so forth. In assembly $ASY_{PE1}$, preamplifier $20_1$ is in a fixed physical relationship relative to the illustrated portion of E-block $38_1$, adhesive layer $51_1$, and stiffener $50_1$. However, in FIG. 3, stiffener $50_1$ may be in the range of 50 to 200 microns thick. Further, assembly $ASY_{PE1}$ includes a flex circuit $52_1$ that includes three adhesive layers $61_1$, $62_1$, and $63_1$, shown with ascending reference numbers in the direction away from surface $50_{1S}$ of stiffener $50_1$ as well as insulating (e.g., KAPTON) layer $64_1$ located between adhesive layers $61_1$ and $62_1$, a copper layer $66_1$ between adhesive layers $62_1$ and $63_1$, and an insulating layer 69, opposite adhesive layer $63_1$ relative to copper layer $66_1$.

Turning now to certain differences between the inventive assembly $ASY_{PE1}$ of FIG. 3 as compared, by way of example, to assembly $ASY_{PA}$ of FIG. 2b, in FIG. 3 the integrated circuit comprising preamplifier $20_1$ is oriented in a novel fashion—particularly, an in opposite fashion as compared to the prior art, in FIG. 3 backside $20_B$ is oriented in the direction toward stiffener $50_1$ and E-block $38_1$, as opposed to the prior art wherein the backside is oriented in the direction away from the stiffener and E-block. Further, also in a preferred embodiment of FIG. 3, an additional backside wafer coating ("BWC") layer 80 is formed along the length of backside 20 and in contact with stiffener 50, or alternatively with a slight air gap between BWC layer 80 and stiffener 50. BWC layer 80 is applied as known in the art, such as by applying a film to the backside of an entire semiconductor wafer from which numerous integrated circuit die (e.g., numerous preamplifiers) are produced by constructing them in connection with the wafer and thereafter separating each die from one another; in the illustrated preferred embodiment, BWC layer 80 is in the area of 25 microns thick. Further, given the novel orientation of preamplifier $20_1$, note further therefore that its face $20_F$ is oriented in the direction away from stiffener $50_1$ and E-block $38_1$, as opposed to the prior art wherein that face is oriented in the direction toward the stiffener. Still further, in assembly $ASY_{PE1}$, conductors, such as bond wires $82_{a1}$ and $82_{b2}$, are used to provide respective electrical connections from conductors $66_{1a}$ and $66_{1b}$ to circuitry on preamplifier $20_1$ and accessible from its face $20_F$.

The configuration of assembly $ASY_{PE1}$ provide numerous advantages over the prior art. For example, numerous thermal impedances in the path between circuitry of preamplifier $20_1$ and E-block 38, are eliminated as compared to the prior art assembly $ASY_{P4}$. Also compared to the prior art, the heat conduction path between preamplifier $20_1$ and E-block $38_1$ is shortened considerably. Specifically, heat may travel directly from the silicon of preamplifier $20_1$ through BWC layer 80 to stiffener $50_1$, whereas in the prior art recall such heat conducted either through solder balls and several layers or underfill material and additional layers, including adhesive layers with their potential associated issues of air gaps, misalignments, and the like, before reaching the prior art stiffener 50. Indeed, as another example of a benefit, with accessibility to face $20_F$ in the fashion of FIG. 3, in certain preferred embodiments there is no need at all for solder ball connections to preamplifier $20_1$ as was implemented in the prior art. As still another example of a benefit, the area of heat dissipation directly from the silicon of preamplifier $20_1$ is potentially more efficient in that the entirety of the length L of backside $20_B$ is in contact with BWC layer 80, as opposed to the variable contact of face $20_F$ in the prior art with either solder balls 68 or underfill material 70. With these various improvements in thermal conductivity of assembly $ASY_{PE1}$, a greater amount of heat may be transferred from preamplifier $20_1$ to stiffener $50_1$ and ultimately to E-block $38_1$ and its surrounding ambient. As a result, the form factor and dimensions related to the entire hard disk assembly may be reduced with acceptable heat and heat transfer so as to sustain higher data speeds and acceptable lifespan and reliability of the entire disk drive. Still other benefits may be appreciated by one skilled in the art.

Figure 4:
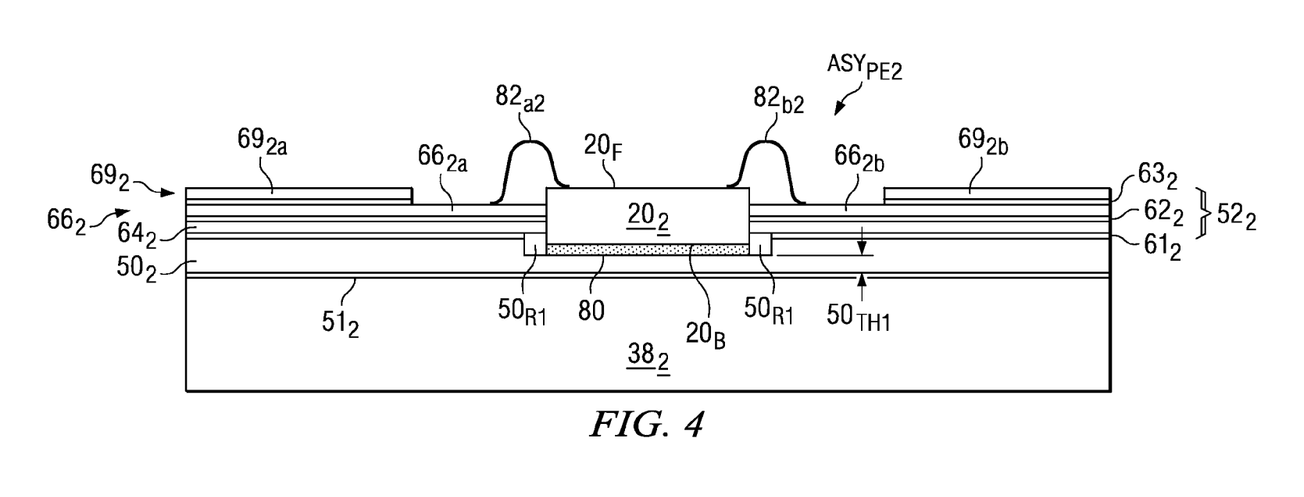
FIG. 4 illustrates a partial cross-sectional view of an assembly in a preferred embodiment similar in certain respects to FIG. 3, but with the preamplifier positioned within a recess of the stiffener.

FIG. 4 illustrates a partial cross-sectional view of an alternative inventive assembly $ASY_{PE2}$ that again includes an E-block $38_2$ and related structure from FIG. 1 and is similar in numerous respects to assembly $ASY_{PE1}$ of FIG. 3. Thus, the reader is assumed with the earlier discussion and only certain differences as to assembly $ASY_{PE2}$ are now discussed. In that regard, in FIG. 4, a recess $50_{R1}$ is formed in or as part of the formation of stiffener $50_2$. In this preferred embodiment, recess $50_{R1}$ is dimensioned so that the outside perimeter of the integrated circuit forming preamplifier $20_2$ may fit within recess $50_{R1}$. Thus, note in FIG. 4 that areas of clearance are shown to both sides of amplifier $20_2$ within recess $50_{R1}$. In any event, with recess $50_{R1}$, the portion of stiffener $50_2$ underlying it has a thickness $50_{TH1}$ that is less than the thickness of stiffener $50_2$ in other areas. For example, the thickness of stiffener $50_2$ may be approximately 380±50 microns (i.e., 15±2 mils), and recess $50_{R1}$ may be cut to a depth in the range of 220 to 240 microns such that thickness $50_{TH1}$ may be approximately 160±50 microns. This reduced thickness $50_{TH1}$ therefore provides less of a thermal impedance to heat conducted from backside $20_B$ of preamplifier $20_2$ toward E-block $38_2$, thereby providing still greater heat transfer and benefits as compared to assembly $ASY_{PE1}$ of FIG. 3.

Figure 5:
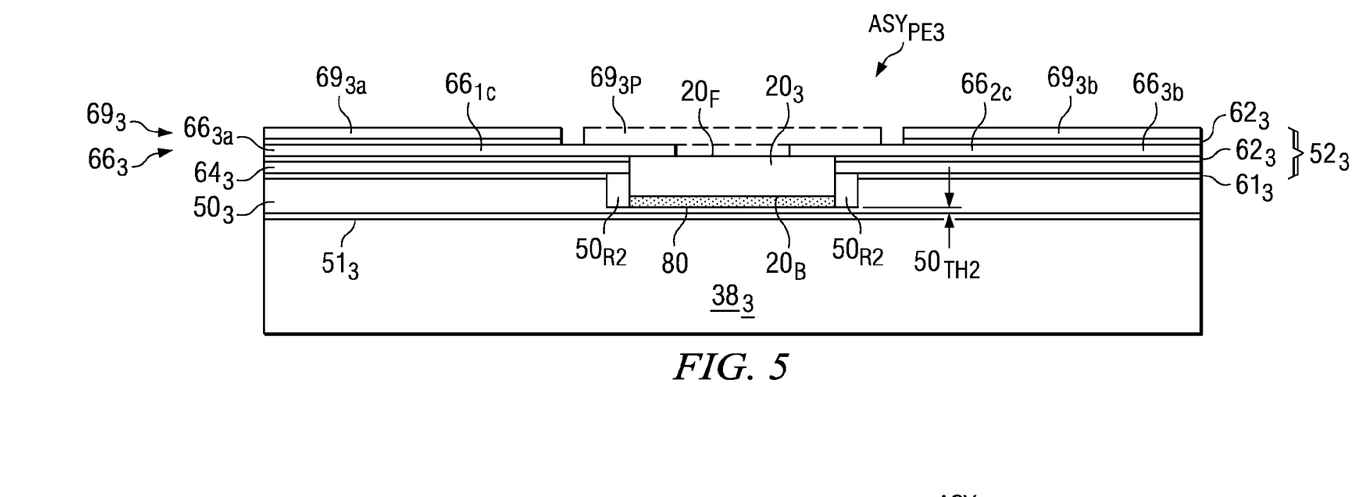
FIG. 5 illustrates a partial cross-sectional view of an assembly in a preferred embodiment similar in certain respects to FIG. 3, but with the preamplifier reduced in thickness, planar electrical connections to the preamplifier, and an optional additional piece covering the preamplifier.

FIG. 5 illustrates a partial cross-sectional view of an alternative inventive assembly $ASY_{PE3}$ that includes an E-block $38_3$, its related structure from FIG. 1, and is similar in numerous respects to assembly $ASY_{PE2}$ of FIG. 4. Thus, only certain differences as to assembly $ASY_{PE3}$ are now discussed. In that regard, in FIG. 5, a recess $50_{R2}$ is formed in or as part of the formation of stiffener $50_3$, and recess $50_{R2}$ may be deeper than recess $50_{R1}$ of $ASY_{PE3}$. Thus, with recess $50_{R2}$, the portion underlying it has a thickness $50_{TH2}$ that is less than thickness $50_{TH1}$ of FIG. 4. For example, recess $50_{R2}$ may be cut to a depth such that thickness $50_{TH2}$ may be less than the approximately 160±50 microns of thickness $50_{TH1}$ of FIG. 4. Either alternatively or in addition to the greater dimensioned recess $50_{R2}$, in assembly $ASY_{PE3}$ the thickness of preamplifier $20_3$ is reduced, that is, the dimension for assembly $ASY_{PE3}$ between face $20_F$ (directed away from E-block $38_3$) and backside $20_B$ (directed toward E-block $38_3$) is less than the distance between those respective edges in assembly $ASY_{PE2}$, where for sake of an example in contemporary applications this reduced thickness of preamplifier $20_3$ may around a value of 200 microns. The change of either or both of recess $50_{R2}$ and the thickness of preamplifier $20_3$ further shortens the conductive heat path from circuitry near face $20_F$ to the ambient exposed to E-block $38_3$. In addition, note also that one or both of these changes, if of the proper dimensions, also permits the elimination of bond wires; in other words, in FIG. 5, conductors $66_{3a}$ and $66_{3b}$ may extend above face $20_F$ and provide direct electrical contact in areas $66_{1C}$ and $66_{2C}$, respectively, to conductors/devices on preamplifier $20_3$, such as through ultrasonic connection, without the addition of an additional connecting apparatus (e.g., bond wire, solder ball, and the like).

Figure 6:
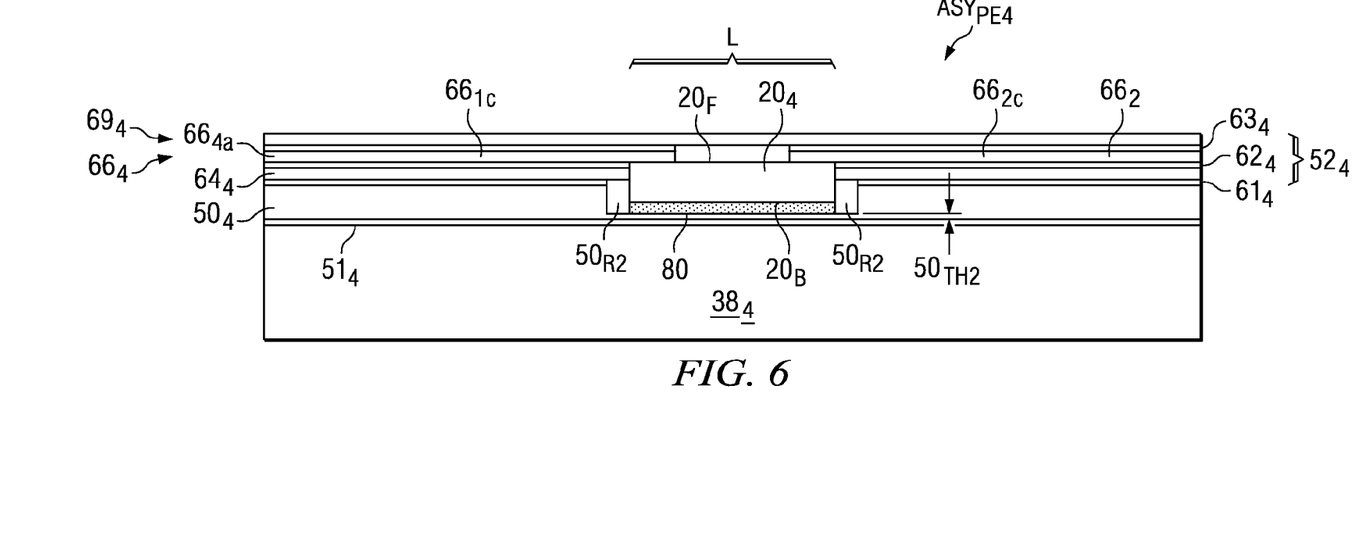
FIG. 6 illustrates a partial cross-sectional view of an assembly in a preferred embodiment similar in certain respects to FIG. 5, but the upper insulating layer extends across the entirety of the length of the preamplifier.

The preferred embodiments also contemplate enclosing the exposed portion and thereby protecting face $20_F$ of preamplifier $20_3$. In this regard, and optionally for assembly $ASY_{PE3}$ of FIG. 5, after the portions of conductors $66_{3a}$ and $66_{3b}$ in areas $66_{1C}$ and $66_{2C}$ are electrically connected to face $20_F$ of preamplifier $20_3$, then in the same plane as and from adhesive layer $62_3$, additional adhesive portions may be formed over the portions of conductors $66_{3a}$ and $66_{3b}$ in areas $66_{1C}$ and $66_{2C}$ and a portion $69_{3P}$ of insulating layer $69_3$ may be formed and adhered in place by those portions. In this manner, portion $69_{3P}$ encloses the area, and thereby protects, the portion of face $20_F$ of preamplifier $20_3$ that remains exposed as between conductors $66_{3a}$ and $66_{3b}$; as this aspect is optional, it is shown with dashed borders in FIG. 5. Further, in FIG. 6, a partial cross-section of an assembly $ASY_{PE4}$ is shown, which is the same as $ASY_{PE3}$ of FIG. 5 except that insulating layer $69_4$ extends across the entirety of the length L of face $20_F$. In this instance, in one preferred approach the portions of conductors $66_{4a}$ and $66_{4b}$ in areas $66_{1C}$ and $66_{2C}$ may be connected, such as by ultrasonic bonding, to the respective connections on face $20_F$ after insulating layer $69_4$ is in place, that is, these connections may be accomplished through the KAPTON (or other material) of insulating layer $69_4$.

Figure 7:
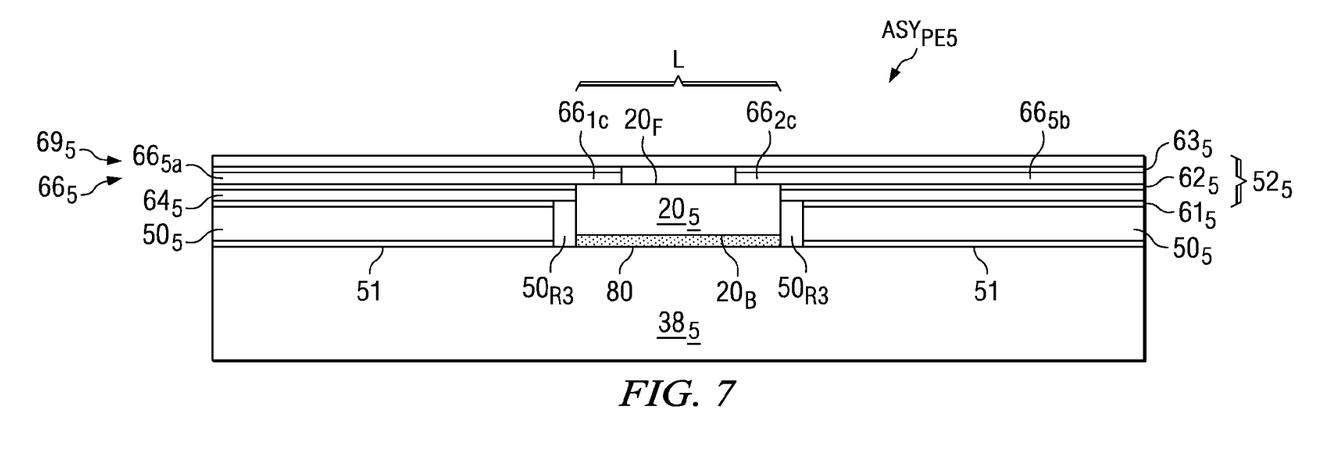
FIG. 7 illustrates a partial cross-sectional view of an assembly in a preferred embodiment similar in certain respects to FIG. 6, but the preamplifier is further recessed and contacts the E-block either directly or via a backside wafer coating.

FIG. 7 illustrates a partial cross-section of an assembly $ASY_{PE5}$ as another alternative embodiment. Assembly $ASY_{PE5}$ is similar to assembly $ASY_{PE4}$ of FIG. 6, except in FIG. 7 a recess $50_{R3}$ is formed as a void, that is, it extends entirely through the thickness of stiffener $50_5$. Thus, stiffener $50_5$ may be manufactured with such a void or the void may be formed, such as with a cutout, entirely through the material (e.g., aluminum) that is used to form stiffener $50_5$. As with assembly $ASY_{PE4}$, for assembly $ASY_{PE5}$ either alternatively or in addition to the greater dimensioned recess $50_{R3}$ the thickness of preamplifier $20_5$ is reduced to again permit the elimination of bond wires and instead so that conductors $66_{6a}$ and $66_{6b}$ may extend above face $20_F$ and provide direct electrical contact in areas $66_{1C}$ and $66_{2C}$, respectively, to conductors/devices on preamplifier $20_5$. Also similar to assembly $ASY_{PE4}$, in assembly $ASY_{PE5}$ face $20_F$ of preamplifier $20_5$ is fully covered and protected in that insulating layer $69_5$ extends across the entirety of the length L of face $20_F$ and again the portions of conductors $66_{5a}$ and $66_{5b}$ in areas $66_{1C}$ and $66_{2C}$ may be connected, such as by ultrasonic bonding, to the respective connections on face $20_F$ after insulating layer $69_5$ is in place. Lastly, one skilled in the art should appreciate an even greater improvement in thermal impedance as between preamplifier $20_5$ and E-block $38_5$, as compared to the above embodiments and the prior art. Specifically, heat may travel directly from the silicon of preamplifier $20_5$ through BWC layer 80 directly to E-block $38_5$; thus, there in that particular path there is no thermal path through any of stiffener $50_5$, solder balls, underfill, or adhesive layers; this is highly advantageous in that it is estimated that heat flow through the wafer thickness of preamplifier $20_5$ is about eight times more efficient than through an equivalent thickness of epoxy underfill. Further, as with previous preferred embodiments, with backside $20_B$ oriented toward E-block $38_5$, the area of heat dissipation directly from the silicon of preamplifier $20_5$ is potentially more efficient in that the entirety of the length L of backside $20_B$ is in contact with BWC layer 80 thereby providing a larger amount of area heat dissipation. With these various improvements in thermal conductivity, a greater amount of heat may be transferred from preamplifier $20_5$ to E-block $38_5$ and its surrounding ambient, providing even greater flexibility in connection with the various benefits described earlier. Still other benefits may be appreciated by one skilled in the art.

Figure 8:
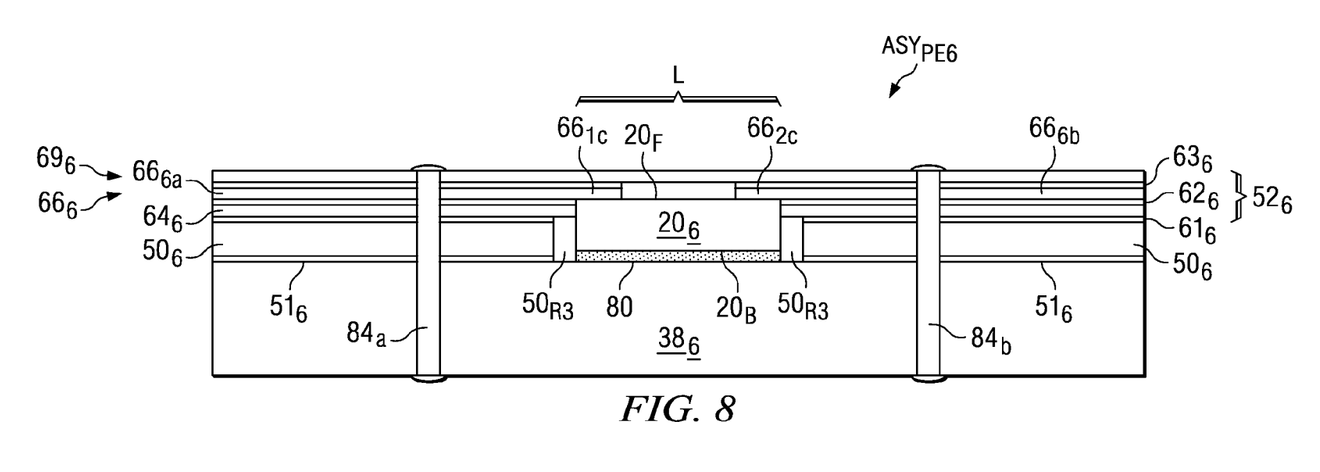
FIG. 8 illustrates a partial cross-sectional view of an assembly in a preferred embodiment similar in certain respects to FIG. 7, with the addition of posts to assist retaining the layers in position relative to one another.

FIG. 8 illustrates a partial cross-section of an assembly $ASY_{PE6}$ as another alternative embodiment. Assembly $ASY_{PE6}$ is similar to assembly $ASY_{PE5}$ of FIG. 7, except assembly $ASY_{PE6}$ further includes metal retaining posts (or pins) $84_a$ and $84_b$ formed through various layers. With reference by example to post $84_a$ (since post $84_b$ is symmetric and through the same layers but in a different location), post $84_a$ is positioned through insulating layers $69_6$ and $64_6$, adhesive layers $61_6$, $62_6$, $63_6$ and 51, copper layer $66_6$, stiffener $50_6$, and E-block $38_6$, such as by forming a hole through each of those items and then inserting the post in place and retaining it by appropriate means, such as caps as shown in the cross-section. While each post $84_x$ is shown to have a cap at each of its ends, in an alternative approach such a post may be friction fit, such as by example friction fitting a post in a hole in E-block $38_6$ and then sliding the remaining layers on top of the post (via holes in each such layer) and capping the post (e.g., such as by soldering). In any events, posts $84_a$ and $84_b$ maintain flex circuit $52_6$, stiffener $50_6$, and E-block $38_6$ tightly together. This retention provides for greater structural integrity and also reduces the chance of any air gaps between layers, where recall from earlier the disadvantage of any such air gap is described in that it provides an additional thermal impedance that thereby reduces the conduction of heat from preamplifier $20_6$ to E-block $38_6$. Thus, the retention of the layers in this manner facilitates better heat conduction from preamplifier $20_6$ to E-block $38_6$. Lastly, note that while posts $84_x$ are implemented in assembly $ASY_{PE6}$, one skilled in the art may choose other methods and mechanisms for such attachment.

Figure 9:
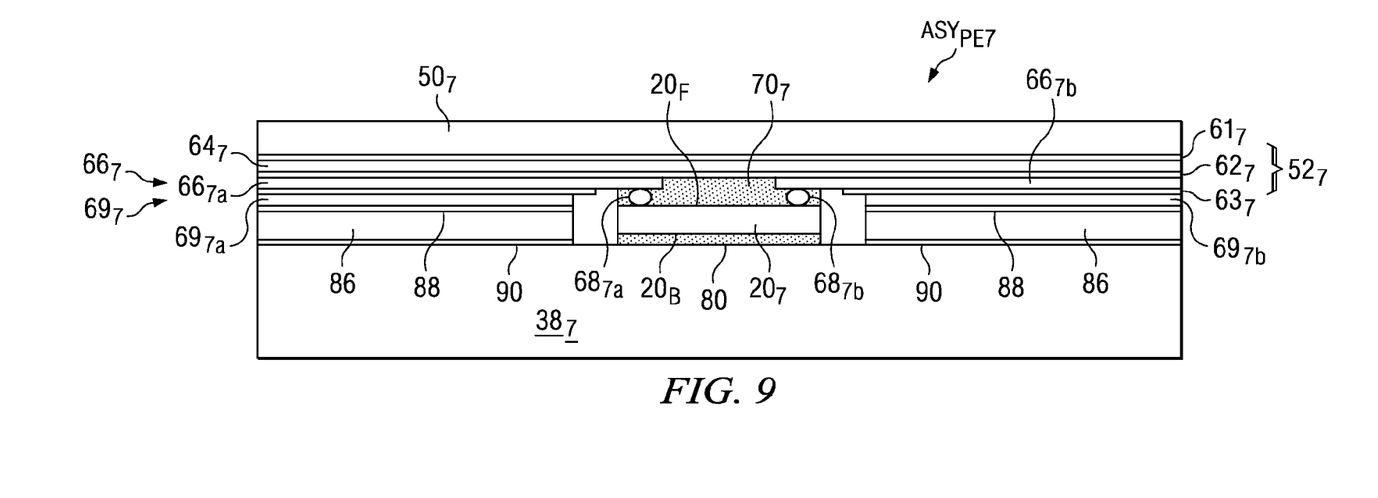
FIG. 9 illustrates a partial cross-section of an assembly as another alternative embodiment wherein the flex may be affixed to the preamplifier and that assembly is then flipped horizontally prior to being affixed relative to the E-block.

In connection with the various inventive teachings above, FIG. 9 illustrates a partial cross-section of an assembly $ASY_{PE7}$ as another alternative embodiment. In various respects, assembly $ASY_{PE7}$ may be considered to include items from the assembly of FIG. 2b, but in FIG. 9 the circuit $52_7$ and preamplifier $20_7$ are flipped horizontally prior to being affixed relative to E-block $38_7$. Moreover, in one approach, flex circuit $52_7$ and preamplifier $20_7$ may be connected to one another as described in connection with FIG. 2b, whereby flex circuit 52' includes three adhesive layers $61_7$, $62_7$ and $63_7$ with a centrally located copper layer $66_7$ and outer insulating layers $64_7$ and $69_7$, where solder balls $68_{7a}$ and $68_{7b}$ connect circuitry on face $20_F$ to different and respective copper segments $66_{7a}$ and $66_{7b}$, and where an underfill material $70_7$ exists between face $20_F$ and portions of flex circuit $52_7$. However, once these devices are so connected, that assembly of items is flipped horizontally so that backside $20_B$ of preamplifier $20_7$ is directly oriented toward E-block $38_7$, and preferably there is some electrical isolation between the two, such as a BWC layer 80 formed along the length of backside $20_B$ and in contact with stiffener E-block $38_7$, or alternatively with a slight air gap between backside $20_B$ of preamplifier $20_7$ and E-block $38_7$. To further support the structure in this manner, assembly $ASY_{PE7}$ also includes spacers 86, that in the illustration of FIG. 9 are retained in place by an adhesive layer 88 between spacer 86 and flex circuit $52_7$ and an adhesive layer 90 between spacer 86 and E-block $38_7$. Spacers 86 may be formed off various materials, such as a hard compound or metal, again including aluminum. In any event, note that assembly $ASY_{PE7}$ provides direct contact between backside $20_B$ of preamplifier $20_7$ to E-block $38_7$. Thus, the heat conduction path between preamplifier $20_7$ and E-block $38_7$ is shortened even beyond that described above, thereby further improving the transfer of heat to E-block $38_7$ and its ambient, with the attendant benefits of the hard disk assembly as detailed earlier and further appreciated by one skilled in the art.

Figure 10:
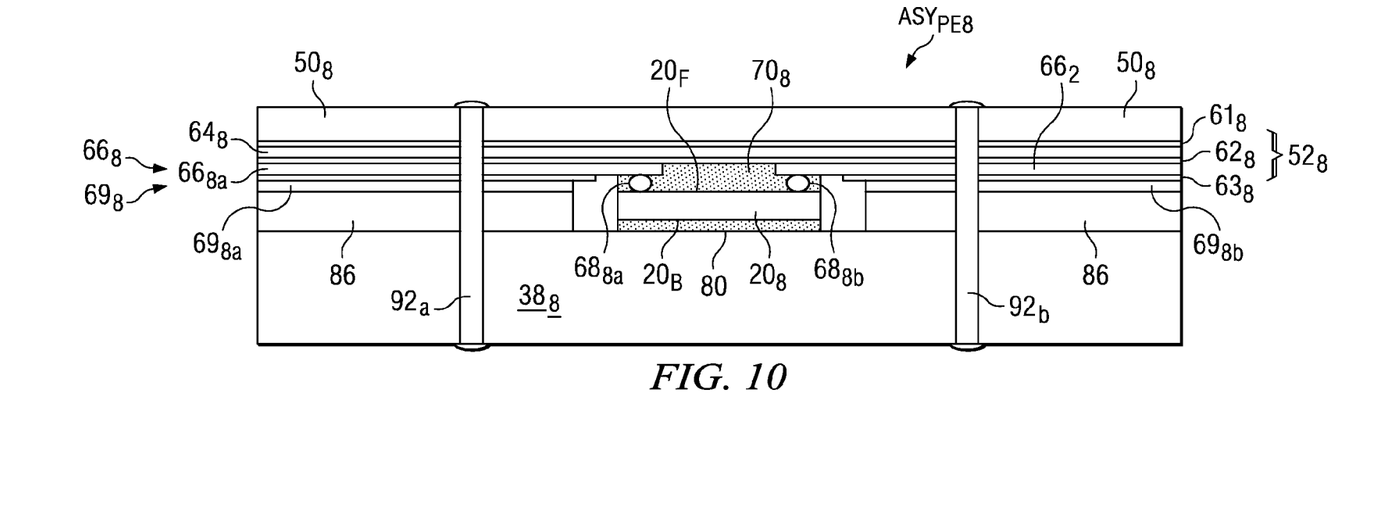
FIG. 10 illustrates a partial cross-sectional view of an assembly in a preferred embodiment similar in certain respects to FIG. 9, with the addition of posts to assist retaining the layers in position relative to one another and with the possible omission of one or more adhesive layers.

FIG. 10 illustrates a partial cross-section of an assembly $ASY_{PE8}$ as another alternative embodiment. Assembly $ASY_{PE8}$ is similar to assembly $ASY_{PE7}$ of FIG. 9, with a difference being that assembly $ASY_{PE8}$ further includes metal retaining posts $92_a$ and $92_b$ formed through various layers. With reference by example to post $92_a$ (since post $92_b$ is symmetric and through the same layers but in a different location), post $92_a$ is positioned through stiffener $50_8$, flex circuit $52_8$, spacer 86, and E-block $38_8$, again such as by forming a hole through each of those items and then inserting the post in place and affixing it by appropriate means, such as caps as shown in the cross-section. In addition, with the retention force provided by posts $92_a$ and $92_b$ and their respective pairs of caps, certain adhesive layers may be omitted in assembly $ASY_{PE8}$ as compared to assembly $ASY_{PE7}$ of FIG. 9. For example, in assembly $ASY_{PE8}$, there is no counterpart to adhesive layers 88 and 90 as used in assembly $ASY_{PE7}$. In any event, once again assembly $ASY_{PE8}$ provides much improved thermal conductivity as between preamplifier $20_8$ and the ambient around E-block $38_8$, as compared to the prior art.

Figure 11:
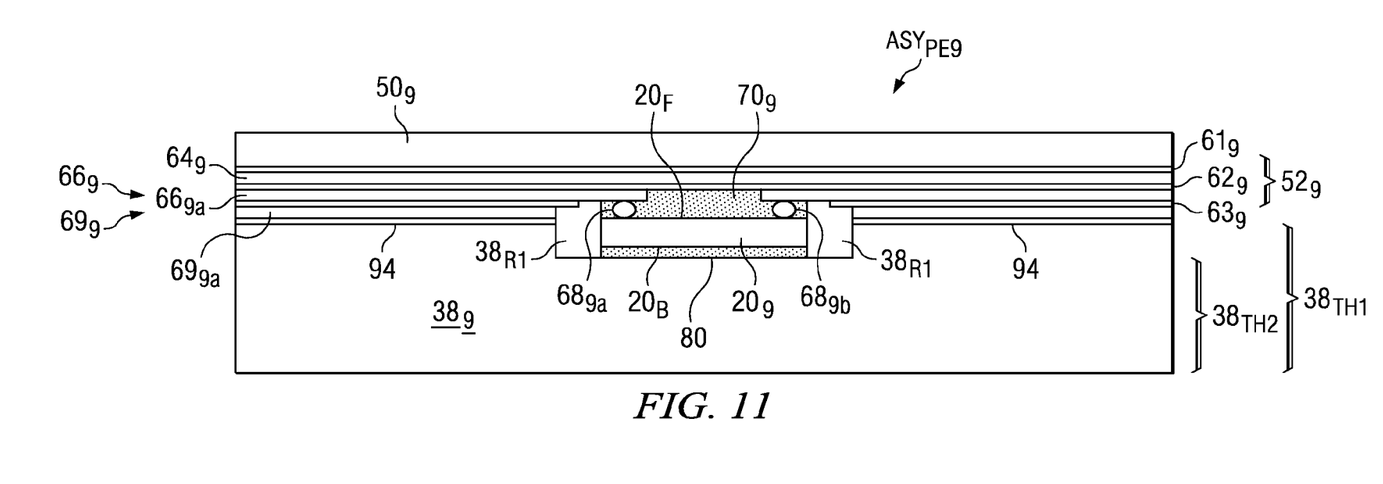
FIG. 11 illustrates a partial cross-sectional view of an assembly in a preferred embodiment similar in certain respects to FIG. 10, but with the preamplifier positioned within a recess of the E-block.
Figure 12:
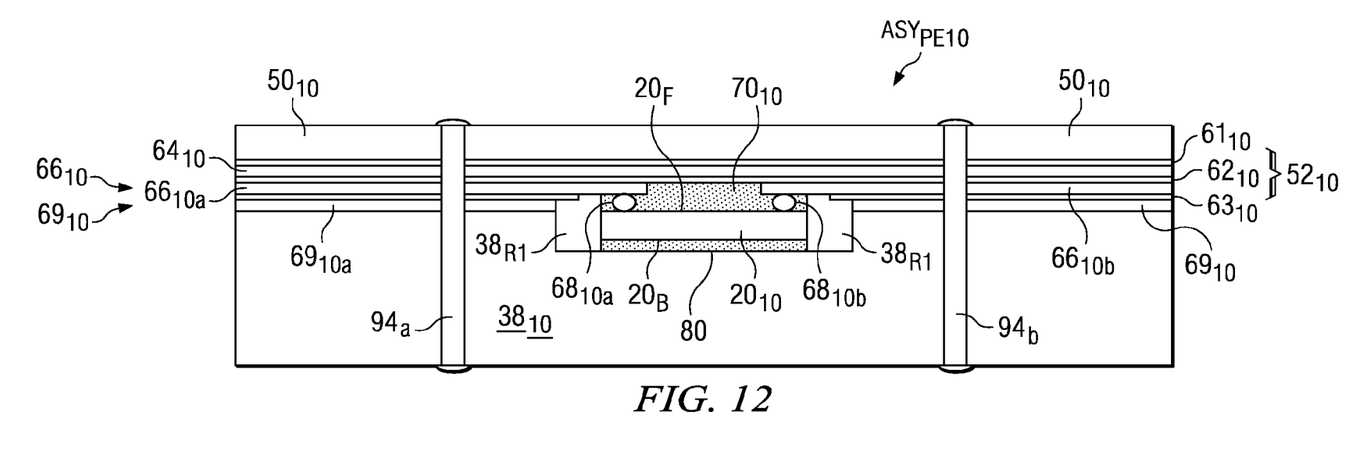
FIG. 12 illustrates a partial cross-sectional view of an assembly in a preferred embodiment similar in certain respects to FIG. 11, with the addition of posts to assist retaining the layers in position relative to one another and with the possible omission of one or more adhesive layers.

FIG. 11 illustrates a partial cross-sectional view of an alternative inventive assembly $ASY_{PE9}$ that is comparable in various respects to assembly $ASY_{PE7}$ of FIG. 9. However, in assembly $ASY_{PE9}$, spacers 86 from FIG. 9 are eliminated by forming a recess $38_{R1}$ in or as part of E-block $38_9$. In this preferred embodiment, recess $38_{R1}$ is dimensioned so that the outside perimeter of the integrated circuit forming preamplifier $20_9$ may fit within recess $38_{R1}$. Thus, note in FIG. 11 that areas of clearance are shown to both sides of preamplifier $20_9$ within recess $38_R$. With the total thickness of E-block $38_9$ being in the range of 500 to 1,000 microns, and with recess $38_{R1}$ provided at a depth of 200 to 500 microns in order to accommodate the thickness of preamplifier $20_9$, then the remaining thickness $38_{TH2}$ is simply the difference between thickness $38_{TH1}$ and that of recess $38_{R1}$. With these aspects and dimensions, note therefore that flex circuit $52_9$ is relatively planar and may be affixed adjacent E-block $38_9$ via an adhesive layer 94. Alternatively, FIG. 12 illustrates a partial cross-section of yet another assembly $ASY_{PE10}$ which is the same as assembly $ASY_{PE9}$ except that the former omits adhesive layer 94 and instead uses posts $94_a$ and $94_b$ to maintain flex circuit $52_9$ in a fixed relationship and in contact with E-block $38_{10}$, where the omission of that adhesive layer further improves thermal conductivity. In all events, for either assembly $ASY_{PE9}$ or assembly $ASY_{PE10}$, direct contact is made between the entirety of the backside $20_B$ of the preamplifier $20_9$ or $20_{10}$ to its respective E-block $38_9$ or $38_{10}$, or through a BWC layer (not shown), thereby permitting heat to conduct very efficiently to the E-block and its surrounding ambient, as compared to the considerable thermal provided in the prior art.

From the above, it may be appreciated that the preferred embodiments provide an disk drive and system with improved thermal conductivity. Numerous embodiments have been provided that demonstrate various alterations that are contemplated, and still other changes may be made. For example, after backside wafer coating of any of preamplifers $20_1$ through $20_{10}$, an additional metallization may be formed on the BWC layer so as to provide better coupling of that region to the next layer (e.g., to a stiffener $50_x$ or directly to E-block 38). As another example, while each stiffener $50_x$ has been shown mated to E-block 38 by way of an adhesive 51, other manners of mating the two may be selected. Moreover, while specific relationships and the inclusion into a computer system have been shown herein, one skilled in the art may make various adjustments while still falling within the inventive scope. Thus, while the present embodiments have been described in detail, various substitutions, modifications or alterations could be made to the descriptions set forth above without departing from the inventive scope which is defined by the following claims.

The invention claimed is:

1. A disk drive data storage system, comprising:
a data storage disk;
a movable member positioned near the data storage disk;
a sensor assembly, supported and movable by the movable member, for writing data to and reading data from the data storage disk; and
an integrated circuit;
a flexible circuit with stiffener positioned relative to the movable member;
wherein the integrated circuit is electrically coupled to the sensor assembly;
wherein the integrated circuit comprises a face and a backside;
wherein the integrated circuit is in a fixed physical position relative to the movable member such that the backside is oriented toward the movable member; and
wherein the integrated circuit moves with the movable member when the movable member moves the sensor assembly, and the backside is in physical contact with the movable member.

2. The system of claim 1 wherein the backside is in physical contact with a layer that is in contact with the movable member.

3. The system of claim 2 wherein the layer comprises a wafer coating.

4. The system of claim 1 wherein the backside layer is separated from the movable member by an air gap.

5. The system of claim 1:
wherein the movable member comprises a surface having a recess therein; and
wherein the integrated circuit is positioned at least in part within the recess.

6. The system of claim 5 wherein the backside is in physical contact with a layer that is in contact with the movable member.

7. A disk drive data storage system, comprising:
a data storage disk;
a movable member positioned near the data storage disk;
a sensor assembly, supported and movable by the movable member, for writing data to and reading data from the data storage disk; and
an integrated circuit;
wherein the integrated circuit is electrically coupled to the sensor assembly;
wherein the integrated circuit comprises a face and a backside;
wherein the integrated circuit is in a fixed physical position relative to the movable member such that the backside is oriented toward the movable member; and
wherein the integrated circuit moves with the movable member when the movable member moves the sensor assembly,
further comprising a flexible circuit in a fixed physical position relative to the movable member and a stiffener,
wherein the face is oriented away from the movable member; and
wherein the flexible circuit comprises at least one conductor that is co-planar with the face and connected between the flexible circuit and a conductor in the integrated circuit.

8. The system of claim 7:
wherein the face is oriented away from the movable member; and
further comprising at least one bond wire connected between the flexible circuit and a conductor in the integrated circuit.

9. The system of claim 7 wherein the flexible circuit comprises at least one insulator that is co-planar with the face and encloses at least a portion of the face.

10. The system of claim 7, wherein the stiffener is in a fixed physical position relative to the flexible circuit.

11. The system of claim 10:
wherein the stiffener comprises a surface having a recess therein; and
wherein the integrated circuit is positioned at least in part within the recess.

12. The system of claim 11:
wherein the face is oriented away from the movable member; and
further comprising at least one bond wire connected between the flexible circuit and a conductor in the integrated circuit.

13. The system of claim 10 wherein the stiffener is adhered to the movable member.

14. The system of claim 13:
wherein the stiffener comprises a surface having a void therein; and
wherein the integrated circuit is positioned at least in part within the void.

15. The system of claim 14 and further comprising at least one post for retaining the stiffener, flex circuit, and movable member in fixed physical positions relative to one another.

16. The system of claim 7 and further comprising a stiffener adhered to the flexible circuit.

17. A disk drive data storage system, comprising:
a data storage disk;
a movable member positioned near the data storage disk;
a sensor assembly, supported and movable by the movable member, for writing data to and reading data from the data storage disk; and
an integrated circuit;
wherein the integrated circuit is electrically coupled to the sensor assembly;
wherein the integrated circuit comprises a face and a backside;

wherein the integrated circuit is in a fixed physical position relative to the movable member such that the backside is oriented toward the movable member; and wherein the integrated circuit moves with the movable member when the movable member moves the sensor assembly, further comprising a flexible circuit in a fixed physical position relative to the movable member and a stiffener, wherein the face is oriented away from the movable member; and wherein the flexible circuit comprises at least one conductor that is co-planar with the face and connected between the flexible circuit and a conductor in the integrated circuit.

18. The system of claim 17 wherein the backside is in physical contact with a layer that is in contact with the movable member.

* * * * *